J. H. BERG.
COFFEE MILL.

No. 179,509.  Patented July 4, 1876.

Attest:  
Wm. Bagger  
C. A. Snow

Inventor:  
Johannes H. Berg,  
by Louis Bagger  
his Atty.

N. PETERS, PHOTO-LITHOGRAPHER, WASHINGTON, D. C.

UNITED STATES PATENT OFFICE.

JOHANNES H. BERG, OF ST. OLAF, MINNESOTA.

IMPROVEMENT IN COFFEE-MILLS.

Specification forming part of Letters Patent No. 179,509, dated July 4, 1876; application filed March 11, 1876.

*To all whom it may concern:*

Be it known that I, JOHANNES H. BERG, of St. Olaf, in the county of Otter Tail and State of Minnesota, have invented certain new and useful Improvements in Coffee-Mills; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
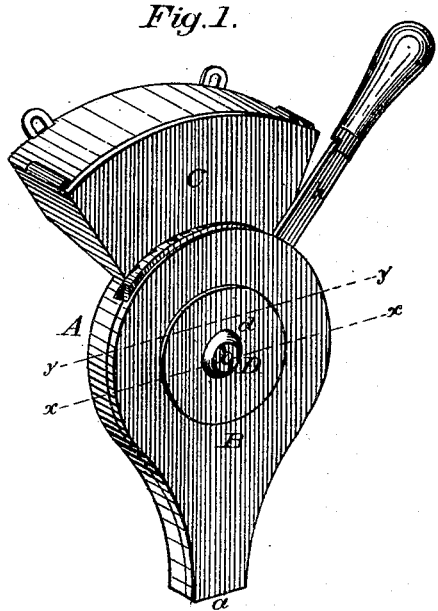
Figure 3:
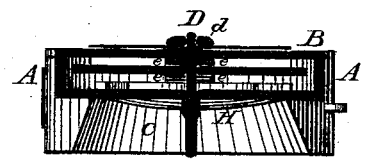
Figure 4:
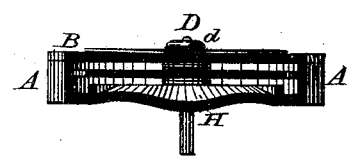
Figure 2:
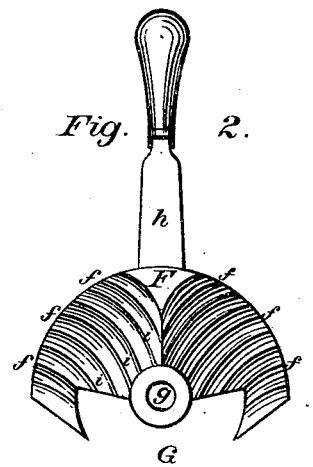

Figure 1 is a perspective view. Fig. 2 is a perspective view of the grinding-disk detached; and Figs. 3 and 4 are sections after the lines $x\ x\ y\ y$.

Similar letters of reference indicate corresponding parts in all the figures.

This invention relates to mills for grinding coffee; and it consists in the construction and combination of parts hereinafter more fully shown and described.

In the drawing, A is the box or body of the mill, having the removable front or cover B. Box A has a flaring mouth or funnel, C, through which the coffee is fed into the mill. D is a central screw-threaded pivot, upon which works the reciprocating grinding-disk G. This is of the configuration shown in Fig. 2, and consists of a semicircular disk, F, having ribs $f$ that form curved grooves $i$, extending from the central pivoting-point $g$ in opposite directions toward the periphery of the disk. It has a lever or handle, $h$, by which a reciprocating motion may be imparted to it. Upon the inside of box A, just below the mouth C, is the projecting grinding-plate H, between which and disk F the coffee is crushed or ground. The center of this is slightly depressed, in order to allow the coffee, when fed into the mill, to sink down far enough for ribs $f$ to catch it and crush it against the more projecting parts of the plate, when it drops down between grooves $i$ and plate H, and out through opening $a$ in the bottom of the box; but, unlike disk F, the surface of plate H has no projections or ribs, but is perfectly even, with exception of the central depression. This construction of plate H causes the coffee to be more readily grasped and crushed by disk F, when set in motion, than if the surface of it had been roughened or ribbed.

The degree of fineness to which the coffee is ground may be regulated by inserting washers $e$ between disk F and plate H, as shown. Cover B is secured to box A by means of a nut, $d$, upon pivot D, which projects through a perforation in the cover.

The advantages of my improved coffee-mill will be readily seen from the foregoing description. It can be manufactured from cast-iron exclusively, and may therefore be produced at a small cost. It occupies but little space, and presents, when properly finished, a neat appearance. The coffee is ground in it quickly and evenly, and much more easily than in most of the hand-mills now in use.

Having thus described my invention, I claim, and desire to secure by Letters Patent of the United States—

The combination, in a coffee-mill, of the box A, having flaring mouth or feed-funnel C, removable plate or cover B, and projecting grinding-plate H, with the reciprocating grooved and ribbed grinding-disk F, having lever or handle $h$, all constructed and arranged to operate substantially in the manner and for the purpose set forth.

In testimony that I claim the foregoing as my own I have hereto affixed my signature in presence of two witnesses.

JOHANNES H. BERG.

Witnesses:
JUSTIN L. MILLER,
CHRISTEN OLSON HOLE.